United States Patent Office 3,055,862
Patented Sept. 25, 1962

3,055,862
STABILIZATION OF POLYPROPYLENE WITH 2,2'-METHYLENE BIS(4,6-DI-TERT-BUTYL RESORCINOL)
Floyd E. Bentley, Austin, Tex., assignor to Jefferson Chemical Company, Inc., Houston, Tex., a corporation of Delaware
No Drawing. Filed Nov. 14, 1960, Ser. No. 68,633
3 Claims. (Cl. 260—45.95)

This invention relates to a new composition of matter. More particularly, this invention relates to a new composition of matter which is useful as an antioxidant and to polymer compositions stabilized against oxidation deterioration through the incorporation therein of the novel composition of the present invention.

High molecular weight olefin polymers such as normally solid thermoplastic polymers of ethylene, propylene, etc., are subject to deterioration when contacted with oxygen, particularly at temperatures above about 100° C. It is generally necessary to heat such polymers above 100° C. during fabrication.

It has been proposed to overcome this problem by incorporating into the polymer a hindered phenol type compound in order to stabilize the polymer against oxygen deterioration. The results obtained with the heretofore proposed hindered phenols have left much to be desired.

In accordance with the present invention a new compound has been discovered which has been found to be surprisingly effective in stabilizing normally solid thermoplastic olefin polymers.

The new compound of the present invention is 2,2'-methylene-bis(4,6-di-tert-butyl resorcinol) and may be prepared with ease by the acid catalyzed alkylation of resorcinol with isobutylene in organic solvent solution under ambient conditions of temperature and pressure in order to provide 4,6-di-tert-butyl resorcinol. 4,6-di-tert-butyl resorcinol may be reacted with formaldehyde in aqueous suspension under ambient conditions, to give the compound of the present invention, which melts at 226°–227° C.

The compound of the present invention, as indicated, has particular utility as an antioxidant for stabilizing olefin polymers against oxygen deterioration. The compound of the present invention may be incorporated into an olefin polymer to be stabilized in any desired manner. For example, the compound may be added to powdered olefin polymer and blenched therewith to form a blend which may then be extruded and pelleted by conventional techniques to provide a stabilized olefin polymer composition. It will be understood, of course, that other additives such as plasticizers, dyes, pigments, etc., may also be added to the polymer composition.

In general, from about 0.005 to about 1 wt. percent of the compound of the present invention may be incorporated into an olefin polymer in order to obtain satisfactory stabilization. More preferably, from about 0.05 to about 0.5 wt. percent of the compound of the present invention is employed, based on the weight of the olefin polymer to be stabilized.

The invention will be further illustrated by the following specific examples which are given by way of illustration and not as limitations on the scope of this invention.

EXAMPLE 1

About 0.5 mol of resorcinol and about 0.055 mol of concentrated sulfuric acid were added to 300 ml. of chlorobenzene and about 2 mols of isobutylene per mol of resorcinol were metered into the thus prepared mixture over a period of about one hour at a temperature of about 65° C. and a pressure of about one atmosphere. As a consequence, alkylation of the resorcinol with isobutylene was initiated, which resulted in the formation of 4,6-di-tert-butyl resorcinol. After agitation for an additional one hour at 65° C. the 4,6-di-tert-butyl resorcinol was recovered from the reaction mixture by addition to 10% sodium carbonate solution and filtration of the precipitated product.

The thus recovered 4,6-di-tert-butyl resorcinol was reacted with formaldehyde to form the compound of the present invention by adding about 31.2 grams of 4,6-di-tert-butyl resorcinol to about 6.1 grams of 37% aqueous formaldehyde and about 77 ml. of water containing about 2% concentrated $H_2SO_4$ at a temperature of about 95° C. and a pressure of about one atmosphere to provide a reaction mixture which was agitated under the above conditions for about three hours. The compound of the present invention was recovered from the reaction mixture by filtration and thoroughly washed with water to provide substantially pure 2,2'-bis-methylene-(4,6-di-tert-butyl resorcinol) melting at 226°–227° C.

EXAMPLE 2

A series of polypropylene compositions were prepared by adding about 0.1 wt. percent of a stabilizer to powdered normally solid thermoplastic polypropylene. In each instance, the polymer, after having the stabilizer intimately mixed therewith was fabricated into a thin film of about ten mils by melt pressing.

Each of the compositions was heated at 100° C. for 75 hours in the presence of oxygen. Absorption of oxygen was followed by means of gas measuring burettes during the heating period in order to obtain a measurement of antioxidant effectiveness.

The antioxidants tested and the results obtained are set forth in the following table.

Table 1

| Antioxidant: | Ml. $O_2$ absorbed/gm. polymer after 75 hours at 100° C. |
|---|---|
| 2,6-di-tert-butyl-para-cresol | 277 (avg.) |
| 2,2'-methylene-bis(4-methyl-6-tert-butyl-phenol) | 77 (avg.) |
| Thio-bis(4-methyl-6-tert-butylphenol) | 98 (avg.) |
| 2,2'-methylene-bis(4,6-di-tert-butyl resorcinol) | 50 (avg.) |

From the foregoing table it is seen that compound of the present invention was significantly and surprisingly effective as an antioxidant for the polypropylene.

Having described my invention, what is claimed is:

1. A composition comprising normally solid thermoplastic polypropylene having incorporated therein a stabilizing amount of 2,2'-methylene-bis(4,6-di-tert-butyl resorcinol).

2. A method for stabilizing a normally solid thermoplastic propylene polymer which comprises incorporating therein a stabilizing amount of 2,2'-methylene-bis(4,6-di-tert-butyl resorcinol).

3. A method as in claim 2 wherein from about 0.005 to about 1 wt. percent of 2,2'-methylene-bis(4,6-di-tert-butyl resorcinol), based on the weight of the polymer, is incorporated thereinto.

References Cited in the file of this patent

UNITED STATES PATENTS 2,957,849   Kennedy _____ Oct. 25, 1960

OTHER REFERENCES

Shah et al.: "Jour. Univ. Bombay," vol. 4 (1935), pp. 109–13 (30 Chem. Abstracts 5, 196).